United States Patent [19]

Pinchuk et al.

[11] Patent Number: 5,028,479

[45] Date of Patent: Jul. 2, 1991

[54] POLYMERIC ANTICORROSION FILM

[76] Inventors: Leonid S. Pinchuk, ulitsa Petchenko, 14, kv. 17; Viktor A. Goldade, ulitsa Kozhara, 5, kv. 30; Igor M. Vertyachikh, ulitsa P. Brovki, 25, kv. 84; Semen Y. Liberman, ulitsa B.Khmelnitskogo, 108, kv. 27; Grigory V. Rechits, ulitsa Fedjuninskogo, 6, kv. 88, all of Gomel; Benyamin A. Finkelshtein, ulitsa Olgi Forsh, 15, korpus 1, kv. 214; Vladimir I. Shmurak, ulitsa Liflyandskaya, 10, kv. 54, both of Leningrad; Jury I. Voronezhtsev, ulitsa Klermon-Ferran, 6, kv. 33; Vladimir V. Snezhkov, ulitsa Pushkina, 16, kv. 5, both of Gomel; Grigory A. Goncharov, derevnya Eremino, ulitsa Novaya, 15, Gomelskaya oblast, all of U.S.S.R.

[21] Appl. No.: 313,597

[22] Filed: Feb. 21, 1989

[51] Int. Cl.$^5$ .................... B32B 5/14; B32B 3/26
[52] U.S. Cl. .................... 428/310.5; 428/314.8; 428/318.8; 428/321.1
[58] Field of Search .............. 428/304.4, 305.5, 309.9, 428/310.5, 318.6, 318.8, 314.4, 314.8, 321.1, 322.7; 427/393.5; 264/209.1, 211, 564; 106/14.05; 521/51, 82

[56] References Cited

U.S. PATENT DOCUMENTS

| 2,521,311 | 9/1950 | Schwoegler et al. | 428/305.5 X |
| 3,311,681 | 3/1967 | Cherney et al. | 264/53 X |
| 3,560,600 | 2/1971 | Gliniecki | 264/48 |
| 3,775,350 | 11/1973 | Juhas | 428/318.8 X |
| 4,104,440 | 8/1978 | Collins | 428/402 |

FOREIGN PATENT DOCUMENTS 768057  9/1967  Canada .......................... 428/318.8

*Primary Examiner*—George F. Lesmes
*Assistant Examiner*—Christopher Brown
*Attorney, Agent, or Firm*—Lilling and Lilling

[57] ABSTRACT

A polymeric anticorrosion film having a thermoplastic matrix made with a gradual transition from a nonporous to a porous structure formed by a system of closed and communicating pores filled with an inhibitor liquid with an increasing apparent density to a value equal to the thermoplastic density by ¼-⅔ of the film thickness in the direction from one of its surfaces.

1 Claim, 4 Drawing Sheets

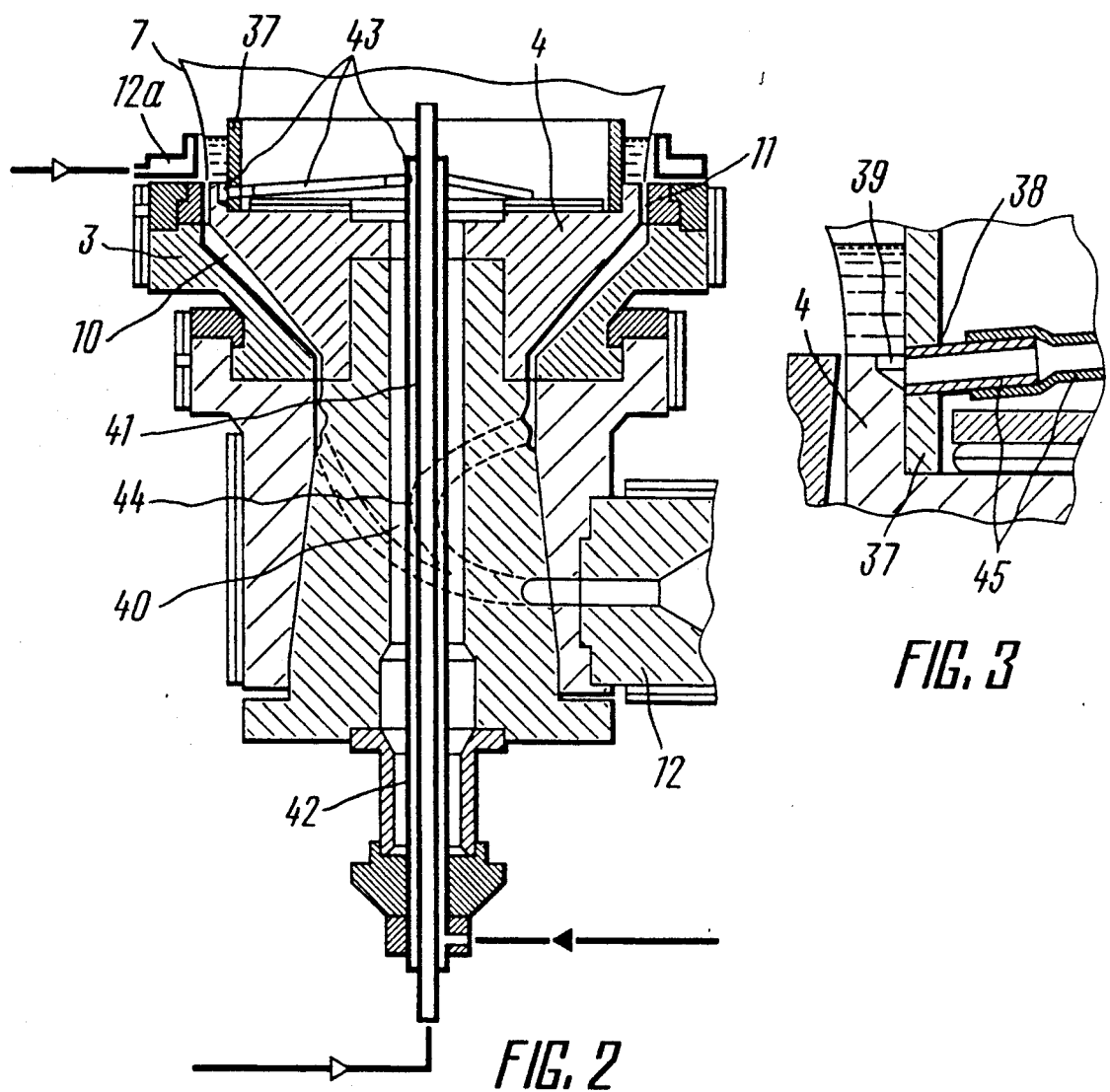
FIG. 2
FIG. 3
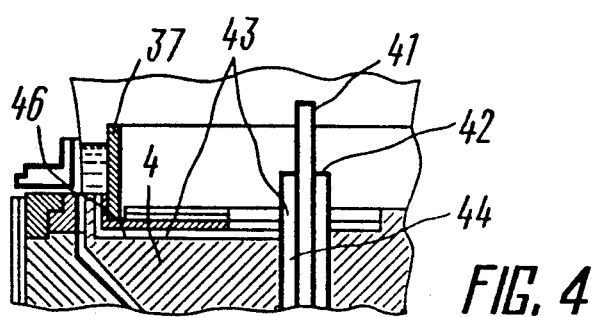
FIG. 4

POLYMERIC ANTICORROSION FILM

BACKGROUND OF THE INVENTION

1. Field of the Invention

The present invention relates to the art of corrosion protection by means of chemically resistant materials insulating metal articles from the effect of the atmosphere and aggressive media and, more specifically, it relates to a polymeric anticorrosion film.

The present invention is useful in simultaneous slughing and packing of metal articles in machine-building, tool manufacture, instrument making and in other industries.

2. Description of the Related Art

At present, among the most applicable means for corrosion protection of metals there should be indicated insulation of the articles to be protected with coatings and lubricants containing contact inhibitors of metal corrosion, as well as sealing of metal articles into polymeric packages with a protective atmosphere created thereinside inhibiting the occurrence of corrosion processes. The latter technique is in many cases most acceptable, since it enables corrosion protection of not only individual parts of a simple shape, but complete units and apparatus composed of them. The anticorrosion effect is attained by saturating the inner space of the package with volatile corrosion inhibitors, the source thereof being the material of the package per se, i.e. the inhibited polymeric film.

Known in the art is a two-layer polymeric anticorrosion film, wherein one of the layers is made porous so that its pores are filled with a volatile inhibitor of atmospheric corrosion, such as ammonium dicyclohexylnitrite, monoethanolamine benzoate, and the like.

The process for producing this film comprises separate extrusion of a melt of a mixture of a thermoplastic with a corrosion inhibitor and of a thermoplastic melt, followed by an adhesion joining of the two polymeric layers differing in both thickness and structure.

In the place of joining of the layers the resulting film has a distinct boundary of transition from the porous structure to the non-porous one. The porous layer has a uniform porosity and density across its thickness. For implementation of this process use is made, as a rule, of a two-slit extrusion die that necessitates additional energy consumption.

The film has sufficiently high anticorrosion properties, but its application is limited by different conditions of its exploitation. This is caused, first of all, by the use, in its manufacture, of only heat-resistant corrosion inhibitors due to high extrusion temperatures, but the range of such inhibitors is rather limited. Secondly, the films cannot be of a thickness less than 40 μm at a sufficient content of the corrosion inhibitor in pores of the thermoplastic matrix.

For the manufacture of a multi-layer film with good process characteristics it is necessary that the non-porous and porous layers be made substantially from the same thermoplastic and under the same conditions of its processing. Otherwise, the multi-layer film can be separated into layers owing to different nature of the employed thermoplastics, different orientation stretching and shrinkage of polymer layers upon packing of articles thereinto, e.g. by the method of vacuum thermoforming. The separation into layers brings about deterioration of service characteristics of the film and of commercial appearance of the packages.

Known in the art is a polymeric anticorrosion film having one side thereof coated with a layer of a finely divided powder-like corrosion inhibitor. The process for the manufacture of such a film comprises extrusion of a melt of a thermoplastic, following by blow-molding thereof into a tubular article by means of compressed air saturated with a finely divided powder of a corrosion inhibitor (SU, A, 859178).

For implementation of this process use is made of an extrusion die comprising a housing, a hollow mandrel and an insert with a duct for the supply of compressed air disposed inside the mandrel coaxially thereto and projecting above its end face. The projecting part of the insert is made closed with radial holes for the supply of compressed air saturated with a fine powder of a corrosion inhibitor.

The film produced by this process does not have sufficiently high characteristics of anticorrosion properties, since a portion of the powder during its application slips down and the inhibition is non-uniform. Furthermore, the saturation of the film with a powder-like inhibitor is difficult because it does not substantially penetrate into the film but remains only on the surface.

Known is a polymeric anticorrosion film based on a thermoplastic, wherein a corrosion inhibitor is uniformly distributed over the entire volume thereof. The film is produced by extrusion of a mixture of a thermoplastic with a corrosion inhibitor, followed by blowing up the melt into a tubular article upon cooling. This process is effected in an extrusion die (SU, A, 722779) comprising a whole housing with a nozzle, a mandrel provided therein and passing through the nozzle, and having in its body at least one channel for the supply of compressed air and at least one channel for the supply of a lubricating liquid. The walls of the housing and of the nozzle form together with the mandrel walls a shaping duct passing into an annular forming slit in the zone of which in the mandrel body there is provided an O-shaped recess opened towards it. In the recess a bushing is provided made from a material permeable for the inhibitor; the inner wall of the bushing and the recess walls form a chamber communicating with the channel for the supply of the lubricating liquid. The latter liquid is supplied under pressure from the above-mentioned chamber into the forming slit upon passing the melt of a mixture of the thermoplastic with the inhibitor so that the lubricating liquid creates a uniform layer along the length of the above-mentioned slit. The use of the lubricating liquid ensures a lower coefficient of friction of the thermoplastic melt against the slit walls and enables processing of highly extended thermoplastics. The lubricating liquid provides no effect on the anticorrosion properties of the film.

This film does not possess the required anticorrosion properties, since the inhibitor is present in the thermoplastic in the encapsulated form and its liberation into the space being sealed is hindered.

Known in the art is an anticorrosion polymeric film based on a plastified polymer incorporating a corrosion inhibitor. The film structure across the thickness thereof represents a polymeric matrix with a system of pores filled with a plastifying agent or a solution thereof with a corrosion inhibitor (inhibitor liquid). The pores are uniformly distributed over the entire volume of the thermoplastic so that its density across the film thickness is not changed. The process comprises extrusion of a melt of a mixture of the thermoplastic with the plastifying agent, e.g. mineral oil, through the chaping channel of an annular die, followed by air-blowing of the melt into tube upon a continuous atomization of the corrosion inhibitor as a liquid in the cavity of the formed tubular article in an electric field.

To this end, an apparatus is used which comprises a system for the corrosion inhibitor supply, a means for the formation of an electric field inside the tubular article and an extrusion die having a hollow housing with a nozzle and a mandrel provided therein and passing through the mandrel; in the mandrel body there is provided at least one duct for the supply of compressed air and at least one duct for the supply of the inhibitor inside the formed tubular article; the walls of the housing and of the nozzle form with the mandrel walls a shaping channel passing into an annular slit. The introduction of the corrosion inhibitor into the plastified polymer is effected in the following manner.

The material coming out of the extrusion die of the extruder is in a viscous-flow state (at a temperature of about 140° C.), wherefore vapors or small drops of the inhibitor are effectively absorbed by the plastifying agent, in particular mineral oil, which is a sorbent for inhibitors, and are dissolved therein. After cooling of the film and the formation of a porous matrix in the material, the inhibitor migrates to the surface together with the plastifying agent. The procedure for the manufacture of this film is rather simple, but the resulting film has insufficient anticorrosion properties for the following reasons.

First, the porous structure of the film over all its volume contributes to diffusion and, hence, to release of the inhibitor not only on the inner surface of the film and further into the sealed space of the package, but onto the external surface as well. This reduces the protective period of the film and increases a non-efficient consumption of the inhibitor. Second, the conversion of the inhibitors into a gaseous state at elevated temperatures for saturation of the inner surface of the tubular film by the inhibitor vapors in many cases lowers the effectiveness of these inhibitors due to a thermal decomposition thereof; an electrostatic atomization of liquid-phase inhibitors without heating thereof faces certain process difficulties and additional power consumption. Furthermore, the life time of the corrosion protection with such films is not long due to the impossibility of introducing the inhibitor in an amount exceeding 3–4% by mass.

SUMMARY OF THE INVENTION

It is an object of the present invention to provide a single-layer polymeric anticorrosion film with such a structure and such distribution of the corrosion inhibitor in the thermoplastic matrix which would possess good anticorrosion properties upon liberation of the inhibitor only towards the protected metal article, as well as a process and an apparatus for producing this film which, at a simple procedure, low material and power consumption, would ensure the required characteristics of the above-mentioned film.

This object is accomplished by the provision of a polymeric anticorrosion film comprising a thermoplastic matrix with a non-uniform structure and an inhibitor liquid, wherein, according to the present invention, the thermoplastic matrix is made with a gradual transition from a non-porous to a porous structure formed by a system of closed and communicating pores filled with the inhibitor liquid which is a corrosion inhibitor in a liquid phase or a solution thereof in a plastifying agent with an increase of the apparent density to a value equal to the thermoplastic density by $\frac{1}{4}$ to $\frac{2}{3}$ of the film thickness in the direction from one of its surfaces.

The film according to the present invention is characterized by high anticorrosion and physico-mechanical properties which are determined by its structure and by distribution of the corrosion inhibitor therein. The film is a single-layer one and made from the same thermoplastic having different structure across its thickness. This film has functions of a multi-layer film, but has no disadvantages thereof associated with different adhesion of the film layers at the area of their joining and with their peeling-off during storage and exploitation. The gradual transition of the porous structure to the non-porous one from one surface of the film towards another ensures a non-uniform distribution of the corrosion inhibitor across the film thickness which to a considerable extent determines anticorrosion properties of the film. This arrangement of the film makes it possible to ensure a high concentration of the corrosion inhibitor at one of its surfaces and to control its release only in one direction, i.e. only into the volume of the package protecting the metal articles. This results in reduced losses of the corrosion inhibitor and an improved efficiency of protection, and in better conditions of labor for the personnel at the posts of preservation and packing of the metal articles.

In the film according to the present invention each of the structures has its own distinctive features and performs its specific function. The non-porous structure (solid polymer) bears the basic mechanical load and serves as a barrier for the inhibitor hindering its liberation into the external space and thus reducing ineffective consumption of the inhibitor; it also hinders permeation of aggressive media into the package. The porous structure comprises a polymeric gel with its basic feature residing in the availability of a porous polymeric matrix having its pores filled with the inhibitor liquid which is a corrosion inhibitor or a mixture thereof with a plastifying agent, e.g. mineral oil.

During exploitation (or storage) the polymeric gels release spontaneously the inhibitor liquid from the material volume (the phenomenon of syneresis) which can be usefully employed for the provision of a required amount of the contact inhibitor on the film surface or of a required concentration of the volatile inhibitor in the volume being sealed.

Films with such structure retain their high physico-mechanical and anticorrosion characteristics at a thickness of up to 30 μm and more, whereby the range of their application is enlarged.

The object is accomplished also by the provision of a process for producing a tubular polymeric anticorrosion film comprising extrusion of a melt of a thermoplastic, followed by blowing same into a tubular article upon cooling, wherein, according to the present invention, the cavity of the tubular film is filled with an inhibitor liquid and contacting of the moving tubular film is effected with this liquid upon continuously keeping its level below the crystallization line, the difference in the solubility parameters of the inhibitor liquid and the thermoplastic being less than 6.

The process according to the present invention ensures, owing to a simple procedure, the formation of a film with a predetermined structure as described hereinbefore per one cycle, while resulting in a high efficiency of saturation of the thermoplastic with the corrosion inhibitor. The content of the corrosion inhibitor can be varied from 2 to 12% by mass and the volume share of pores, depending on the porous layer thickness, from 15 to 45%.

This process makes it possible to use a broad range of corrosion inhibitors of different heat-resistance, since the temperature during saturation of the thermoplastic with the corrosion inhibitor is considerably lower than the temperature of the process of extrusion of a mixture of the thermoplastic with the inhibitor in extruders following conventional techniques. Depending on the time of contact of the inhibitor liquid and the polymeric tubular film, their solubility parameters, and the rate of extrusion of the thermoplastic, it is possible to adjust the thickness of the plastified layer. A characteristic feature of this process resides in the possibility of confining the corrosion inhibitors, which are mostly toxic substances, in the cavity of the formed tubular film and thus in providing safe labor conditions for the personnel monitoring the process for the manufacture of the film.

For implementation of the process according to the present invention an apparatus is intended which comprises a system for the supply of an inhibitor liquid, an extrusion die having a hollow housing, a nozzle with a mandrel provided therein and passing through the nozzle and having in its body at least one channel for the supply of compressed air and at least one channel for the supply of the inhibitor liquid inside the shaped tubular film, the housing walls and the nozzle form with the mandrel walls a shaping duct passing into an annular forming slit, wherein, according to the present invention, the system of the supply of the inhibitor liquid comprises a vessel mounted with the possibility of reciprocation in the vertical direction at the level of the outlet opening of the channel for the supply of the inhibitor liquid communicating with this vessel by means of a pipe and forming communicating vessels therewith.

Such apparatus is reliable in operation, it provides optimal conditions for realization of the process according to the present invention with all its advantages and without additional material consumption. The system for the supply of the inhibitor liquid makes it possible to maintain in the formed tubular film a constant level of this liquid set as a function of the predetermined thickness of the plastified layer and the corrosion inhibitor concentration in the film ensuring a reliable corrosion protection of the packed articles from various materials under different storage conditions.

It is advisable that the above-mentioned vessel contain means for controlling the level of the inhibitor liquid therein. The presence of the means for controlling the level in the vessel makes it possible to make the inhibitor liquid supply thereinto automated and maintain its level in the tubular polymeric film with a high accuracy.

To ensure the required level of the inhibitor liquid in the tubular film at a small amount of the liquid and to prevent it from evaporation and thermal decomposition due to a high temperature at the end face of the mandrel, it is advisable to mount a bushing at the end face of the mandrel and coaxially thereto, while the outlet opening of the channel for the supply of the inhibitor liquid should be positioned outside the bushing; the ratio of the outside diameter of the bushing to the mandrel diameter at its end face should be selected within the range of from 0.83 to 0.95.

To intensify the process of diffusion of the inhibitor liquid into the thermoplastic matrix at a minimum amount thereof and, hence, to increase its content in the film and to improve reliability of the process of the film inhibition, it is advisable to impart a rotating motion to the inhibitor liquid upon contacting thereof with the moving film at a ratio of the angular rotation speed to the speed of the tubular film movement within the range of from 30 to 60 $m^{-1}$.

For implementation of this process, it is advisable that the apparatus be provided with an appropriate means, for example embodied as an impeller placed close to the mandrel end face and connected with a drive for setting it into a rotating motion.

The object of the present invention is also accomplished by the provision of a process for producing the above-mentioned film which comprises extrusion of a melt of a thermoplastic through the shaping duct of the annular die, followed by blowing it into a tubular film upon cooling, wherein, according to the present invention, in the zone of the outlet of the shaping slit the melt of the thermoplastic is treated with the inhibitor liquid supplied under a pressure of 25 to 45 MPa in the direction of the zone of shaping of a porous structure of the thermoplastic matrix filled with the inhibitor liquid from the side of the inner surface of the tubular film.

This process makes it possible to obtain a polymeric anticorrosion film according to the present invention with a content of the corrosion inhibitor therein ranging from 3 to 12 $g/m^2$ upon variation of the volume share of pores from 10% to 50%. However, it is advisable to use it in the case of inhibiting the thermoplastic matrix with heat-resistant corrosion inhibitors, since the melt temperature is sufficiently high. The film obtained by this process has a high mechanical strength while retaining other advantages, since the formation of its structure with a simultaneous distribution of the corrosion inhibitor therein is connected with the occurrence of the process of structurization on both molecular and supermolecular levels resulting in regularization of the units of the molecular chain predominantly in the longitudinal direction of stretching of the polymeric tubular film.

The polymeric anticorrosion film according to the present invention is obtained, in the first embodiment, by way of extrusion of a melt of a thermoplastic through the shaping duct of the extrusion die, followed by air-blowing thereof into a tubular film upon cooling from the outside. Simultaneously with blowing, the cavity of the tubular film is filled with the inhibitor liquid comprising a corrosion inhibitor in a liquid phase, or its solution in a plastifying agent, and the moving tubular film is contacted with this inhibitor liquid while maintaining its level below the crystallization line. The difference between the solubility parameters of the inhibitor liquid and of the thermoplastic should be less than 6. The essence of the process ensuring the formation of a porous structure in the film with an increasing apparent density to the value equal to the density of the thermoplastic resides in the following.

When leaving the extrusion die, the thermoplastic melt air-blown into a tubular film contacts with the inhibitor liquid. Since prior to the crystallization line it is in the viscous-flow state and well-compatible with the inhibitor liquid, there occurs the formation of a colloidal solution on the inner surface of the tubular film to $\frac{1}{4}$–$\frac{3}{8}$ of its thickness. As the tubular film gets cooled and moves to the crystallization line, the colloidal solution in the thermoplastic is decomposed into phases with the formation of a porous structure with its pores being filled with the inhibitor liquid. The conditions of contacting of the thermoplastic with the inhibitor liquid are selected so that the dissolution of the latter liquid in the thermoplastic proceeds to not more than ⅔ of its thickness. For this reason, a portion of the film structure in the direction towards the outside surface of the tubular film remains poreless.

Owing to the formation of the colloidal solution upon the interaction of the inhibitor liquid with the thermoplastic melt and the subsequent decomposition thereof into phases, a non-uniform structure of the tubular film is formed so that a part of it remains purely polymeric on the outside surface of the tubular film, i.e. non-porous, while on the side of the inner surface a porous structure is formed with the corrosion inhibitor or its solution in the plastifying agent concentrated in its pores.

The structure of the tubular film is characterized by an increase in the apparent density to the value equal to the density of the thermoplastic in the direction from its inner surface towards the outside one. The formation of the non-uniform structure occurs from a melt of the same thermoplastic being extruded through a single-slit annular extrusion die.

The depth of the formation of the porous structure on the side of the inner surface of the polymeric tubular film depends, to a considerable extent, on the time of contact of the inhibitor liquid with the polymer melt determined by the level of the liquid in the cavity of the polymer tubular film and by the rate of extrusion of the polymer melt, as well as by the temperature of the inhibitor liquid and of the polymer melt. This is valid for the difference between the solubility parameters of the thermoplastic and of the inhibitor liquid of less than 6. When this figure is increased, no formation of the colloidal solution due to the process of plastification or dissolution of the polymeric matrix with the inhibitor liquid takes place.

This process has still another specific feature. The inner surface of the tubular film, i.e. the outside surface of the porous structure acquires a specific relief structure in the form of irregular folds and smoothed projections. The developed surface of the film causes a more intensive absorption of the inhibitor; it also ensures a greater mechanical strength of welding seams upon packing of metal articles and makes it possible to impart a decorative appearance to the packaged articles. Furthermore, the well-developed surface of the film ensures an additional saturation of the polymeric tubular film with the corrosion inhibitors after coming of the film out of contact with the inhibitor liquid. The vapors of the volatile inhibitor formed inside the tubular film over the level of the inhibitor liquid are condensed on the film surface and get dissolved in the liquid phase filling the porous structure.

The selected level of the inhibitor liquid in the tubular film depends on a combination of several factors, in particular, on the parameters of solubility of the thermoplastic and the inhibitor liquid under the extrusion conditions (temperature, pressure and rate of extrusion), as well as on certain characteristics of the employed materials (density of the thermoplastic and of the inhibitor, tensile strength and relative elongation of the polymer film, its thickness and time of crystallization, hydrostatic pressure of the inhibitor liquid column in the cavity of the tubular film, and the like).

We have empirically found that for the employed thermoplastics and inhibitor liquids this level should be maintained below the line of crystallization of the thermoplastic, predominantly within the range of from 3 to 100 mm. Above the crystallization line the hydrostatic head of the column of the inhibitor liquid will provide a certain effect on the polymeric tube so that it will push it outside immediately after coming of the melt out of the shaping slit, thus increasing the probability of its breaking. This might cause undesirable consequences, notably the breakdown of the extrusion process, spilling and losses of the inhibitor liquid, and deterioration of the conditions of labor.

To ensure a more effective inhibiting of the thermoplastic at a minimum amount of the inhibitor liquid, it is advisable to impart to the liquid a rotating movement at a ratio of the angular rotation speed of the liquid to the speed of the tubular film movement selected within the range of from 30 to 60 m$^{-1}$.

The physical sense of the ratio of the angular rotation speed of the inhibitor liquid ($\omega$) to the speed (v) of the film movement resides in the number of revolutions of the inhibitor liquid per meter of a linear path of the extruded tubular film. The rotation of the inhibitor liquid upon observing the above-specified speed ratio creates a "liquid vortex" formed at the inner surface of the tubular film. This condition of realization of the process according to the present invention ensures the following advantages.

First of all, using a small amount of the inhibitor liquid above the mandrel and varying the rotation speed, it becomes possible to maintain an optimal level of the liquid contacting with the tubular polymeric film, thus increasing the efficiency of saturation of the film with the corrosion inhibitor, reducing the area of contact of the inhibitor liquid with the mandrel of the extrusion die which has a sufficiently high temperature (for example, for polyolefines it is equal to 423°–493° K.), thus preventing a thermal decomposition of the corrosion inhibitors. Secondly, the interaction of the corrosion inhibitor with the surface of the tubular film is intensified due to the centrifugal forces in the rotating liquid, thus speeding up the process of the formation of the colloidal solution and of the diffusion of the inhibitor liquid into the film body. Thirdly, the vapor jacket at the interface of the thermoplastic melt-corrosion inhibitor which can originate upon their static contact gets destroyed due to an intensive agitation of the inhibitor liquid which also contributes to a deeper penetration of the corrosion inhibitor into the thermoplastic. In addition thereto, the process reliability is increased (breakdowns of the tubular film are excluded) due to a uniform distribution of pressure of the inhibitor liquid on the thermoplastic.

The ratio $\omega/v$ is selected from the following considerations. At a value of less than 30 m$^{-1}$ the content of the corrosion inhibitor in the film is reduced, whereby its anticorrosion properties are impaired; at a value of above 60 m$^{-1}$ the inhibitor's pressure on the tubular film is increased due to a higher centrifugal force, thus causing breakdown of the tubular film and lowering reliability of the process of the film manufacture.

To improve mechanical-strength characteristics of the tubular film while retaining anticorrosion properties thereof and to ensure a relatively smooth inner surface of the tube, the following embodiment of the process according to the present invention is advisable.

A melt of a thermoplastic is extruded through a forming duct and a shaping slit of an extrusion die; at the outlet zone thereof the melt is treated with an inhibitor liquid, i.e. a corrosion inhibitor in the liquid phase or a solution thereof in a plastifying agent, supplied under a pressure of 25 to 45 MPa in the direction of the zone of the formation, on the side of the internal surface of the tubular film, of a porous structure of the thermoplastic matrix filled with this liquid. The pressure range is selected from the processibility considerations. The value of 25 MPa corresponds to a minimum pressure of extrusion, while the upper limit of 45 MPa should not cause outflow of the inhibitor liquid through the shaping slit of the extrusion die inside the continuously extruded polymeric tubular film under high extrusion pressures.

Upon the treatment of the thermoplastic melt in the viscous-flow state with the inhibitor liquid under a pressure of from 25 to 45 MPa in the zone of its outflow from the shaping slit of the extrusion die, changes of the structure occur in the thermoplastic on the molecular and supermolecular levels resulting in regularization of the units of the molecular chain predominantly in the longitudinal direction of stretching of the polymeric tubular film. This results in a considerable increase in the tensile strength of the film. By varying the pressure of the inhibitor liquid within the range of from 25 to 45 MPa on the thermoplastic melt, it is possible to change the apparent density of the porous structure, wherein the volume share of pores is changed from 10 to 50% and the content of the corrosion inhibitor in the film is varied from 5 to 12 g/m$^2$.

Furthermore, the treatment of the thermoplastic melt with the inhibitor liquid under pressure provides:

an increased rate of diffusion of the inhibitor liquid into the melt bulk, thus intensifying the process of the formation of the colloidal solution and ensuring a higher content of the corrosion inhibitors in the film, i.e. increasing the anticorrosion characteristics of the film;

higher mechanical-strength characteristics of the film.

In addition thereto, the process according to the present invention makes it possible to produce an anticorrosion tubular film with a smoother inner surface, thus imparting to the film a higher transparency owing to a reduced light dissipation.

As the thermoplastic base we have used: low-density (high-pressure) polyethylene (LDPE), high-density (low-pressure) polyethylene (HDPE) and polypropylene (PP). The characteristics of the employed polymers are shown in Table 1.

TABLE 1

| Characteristics | LDPE | HDPE | PP |
|---|---|---|---|
| Solubility parameter (MJ/m$^3$), 1/2 | 17 | 16 | 19 |
| Density, kg/m$^3$ | 920 | 950 | 910 |
| Melting temperature, °K. | 378 | 398 | 438 |
| Relative elongation, % | 600 | 600 | 600 |
| Tensile strength, MPa | 12 | 21 | 29 |

For the preparation of solutions of the corrosion inhibitors (inhibitor liquid) it is advisable to make use of plastifying agents—mineral oils compatible with thermoplastics, denoted by letters a, b and c:

(a) selective-purification mineral oil without additives obtained from low-sulphur paraffin and low-paraffin crudes with the following characteristics: density at 293° K. - 0.89 g/cm$^3$, viscosity at 293° K. -14 cSt, ash-content - at most 0.003%, acid number - 0.25 mg KOH/g, congelation temperature - 243° K., flash point in a closed cup - 473° K.;

(b) selective-purification mineral oil without additives produced from low-sulphur crudes with the following characteristics: density at 293° K. - 0.897 g/cm$^3$, viscosity at 293° K. - 20.5 cSt, ash-content - max. 0.003%, acid number - 0.03 mg KOH/g, congelation temperature -255° K., flash point in a closed cup - 523° K.

(c) distillate mineral oil of a high degree of purification with the following characteristics: density at 293° K. - 0.894 g/cm$^3$, viscosity at 293° K. - 49 cSt, at 323° K. - 20 cSt, congelation temperature - 228° K., flash point in an open cup - 436° K.

As the corrosion inhibitors use can be made, for example, of the following products denoted by letters A, B and C:

(A) a mixture of dicyclohexylamine salts (43% by mass) and synthetic fatty acids $C_{10}$–$C_{20}$ (57% by mass) having the general formula: $(C_6H_{11})_2NHC_nH_{2n+1}COOH$ comprising a paste-like product of the density of 0.92 g/cm$^3$ and a melting point of 288°–293° K. soluble in oils and organic solvents; vapor tension at 293° K. -0.013 Pa;

(B) a salt of cyclohexylamine and synthetic fatty acids of the general formula: $C_{13}H_{14}NO_2R$, wherein R is $C_9$–$C_{12}$, a paste-like light-brown substance with the density of 880 kg/m$^3$, melting point of 313° K., congelation point of 293° K.; soluble in water, oils and in organic solvents;

(C) a liquid of a yellow to light-brown color based on a commercial fraction of secondary amines of fatty acids and acrylic acid nitrile of the following general formula:

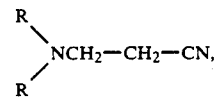

wherein R is $C_nH_{2n+1}$ at n=7–9, density at 293° K. - 0.85 g/cm$^3$, viscosity at 313° K. -6 cSt, congelation temperature - 233° K., boiling temperature at 1.33 kPa pressure - 463° K., self-inflammation temperature - 533° K.; soluble in oils, organic solvents, water; vapor tension at 293° K. is 13.3 Pa.

For a better understanding of the present invention, some specific examples illustrating the processes for the production of a polymeric anticorrosion film are given hereinbelow.

EXAMPLE 1

A melt of low-density (high-pressure) polyethylene ($\rho$=920 kg/m$^3$, solubility parameter $\delta$=17 (MJ/m$^3$)$^{\frac{1}{2}}$ is extruded through the shaping duct and slit of an extrusion die at the speed of the film movement of 0.1 m/s and blown with air into a tubular article simultaneously with cooling thereof. The tubular film below the crystallization line is filled with the inhibitor liquid having the solubility parameter $\delta_1$=20.5 (MJ/m$^3$)$^{\frac{1}{2}}$ and it is continuously contacted with the moving tubular film. The level of the inhibitor liquid equal to 8 mm is maintained constant. The thickness of the extruded film is equal to 150±10 μm.

The inhibitor liquid comprises a 15% solution of inhibitor A in plastifying agent b. The resulting tubular film comprises a polyethylene base made with a gradual transition from a poreless to a porous structure formed by a system of closed communicating pores filled with the above-mentioned solution of corrosion inhibitor A in plastifying agent b.

The apparent density of the resulting film from 900 kg/m$^3$ to a value equal to the LDPE density in the direction from the inner surface of the tubular article is increased by $\frac{1}{4}$ of its thickness, i.e. 37.5 μm. The content of the above-mentioned inhibitor liquid in the porous structure is 4% by mass. The properties of the thus-produced film are shown in Table 2 hereinbelow.

EXAMPLE 2

A tubular polyethylene anticorrosion film is produced as described in the foregoing Example 1, except that the level of the inhibitor liquid is maintained equal to 25 mm.

The apparent density of the resulting film from 892 kg/m$^3$ to a value equal to the LDPE density in the direction from the inner surface of the tubular article is increased by $\frac{1}{2}$ of its thickness, i.e. 75 μm. The content of the above-mentioned inhibitor liquid in the porous structure is 7% by mass. The properties of the thus-produced film are illustrated in Table 2 hereinbelow.

EXAMPLE 3

A tubular polyethylene anticorrosion film is produced in a manner similar to that described in Example 1 hereinbefore, except that the level of the inhibitor liquid is maintained equal to 30 mm.

The apparent density of the resulting film is increased from 886 kg/m$^3$ to a value equal to the LDPE density in the direction from the inner surface of the tubular article by $\frac{2}{3}$ of its thickness, i.e. 100 μm. The content of the abovementioned inhibitor liquid in the porous structure is 11% by mass. The properties of the thus-produced film are illustrated in Table 2 hereinbelow.

EXAMPLE 4

A melt of high-density (low-pressure) polyethylene ($\rho$=950 kg/m$^3$, the solubility parameter $\delta_p$=16 (MJ/m$^3$)$^{\frac{1}{2}}$) is extruded through the shaping duct and slit of the extrusion die and blow by air into a tubular article simultaneously with cooling thereof at the speed of the film movement of 0.1 m/s. Below the crystallization line the tubular film is filled with a 3% solution of the corrosion inhibitor B with the solubility parameter $\delta_B$=22 (MJ/m$^3$)$^{\frac{1}{2}}$ and then the inhibitor is continuously contacted with the moving tubular film. The level of the inhibitor liquid is maintained constant at 15 mm. The thickness of the extruded film is 200±10 μm. The thus-produced tubular film is non-uniform in its structure. The porous structure is filled with the corrosion inhibitor B.

The apparent density of the resulting film is increased from 932 kg/m$^3$ to a value equal to the density of HDPE in the direction from the inner surface of the tubular film by $\frac{1}{4}$ of its thickness, i.e. by 50 μm. The content of the above-mentioned inhibitor liquid in the porous structure is 3% by mass. The properties of the resulting film are shown in Table 2 hereinbelow.

EXAMPLE 5

A tubular anticorrosion polyethylene film is produced in a manner similar to that described in the foregoing Example 4, except that the level of the inhibitor B is maintained equal to 35 mm.

The apparent density of the resulting film from 923 kg/m$^3$ to a value equal to the density of HDPE in the direction from the inner surface of the tubular film is increased by $\frac{1}{2}$ of its thickness, i.e. 100 μm. The content of the above-mentioned inhibitor liquid in the porous structure is 6% by mass. The properties of the thus-produced film are illustrated in Table 2 hereinbelow.

EXAMPLE 6

A tubular anticorrosion polyethylene film is produced as in Example 4 hereinbefore, except that the level of the inhibitor B is maintained equal to 45 mm.

The apparent density of the resulting film is increased from 915 kg/m$^3$ to a value equal to the density of HDPE in the direction from the inner surface of the tubular article by $\frac{2}{3}$ of its thickness, i.e. about 133 μm. The content of the above-mentioned inhibitor liquid in the porous structure is 10% by mass. The properties of the thus-produced film are illustrated in Table 2 hereinbelow.

EXAMPLE 7

A polypropylene melt ($\rho$=900 kg/m$^3$. The solubility parameter $\delta$=19.0 (MJ/m$^3$)$^{\frac{1}{2}}$) is extruded through the shaping duct and slit of an extrusion die and air-blown into a tubular article simultaneously with cooling thereof at the speed of the film movement of 0.1 m/s. The tubular article below the crystallization line is filled, at the initial moment, with the corrosion inhibitor C with the solubility parameter $\delta_c$=21.5 (MJ/m$^3$)$^{\frac{1}{2}}$) and then it is continuously contacted with the moving tubular film. The level of the inhibitor C equal to 15 mm is maintained constant. The resulting tubular film is non-uniform in its structure. The porous structure is filled with the corrosion inhibitor C.

The apparent density of the thus-produced film is increased from 891 kg/m$^3$ to a value equal to the density of PP in the direction from the inner surface of the tubular film by $\frac{1}{4}$ of its thickness, i.e. by 25 μm. The content of the above-mentioned inhibitor liquid in the porous structure is 4% by mass. The properties of the resulting film are shown in Table 2 hereinbelow.

EXAMPLE 8

A tubular anticorrosion polypropylene film is produced in a manner similar to that described in the foregoing Example 7, except that the level of the inhibitor C is maintained equal to 35 mm.

The apparent density of the resulting film is increased from 883 kg/m$^3$ to a value equal to the density of PP in the direction from the inner surface of the tubular film by $\frac{1}{2}$ of its thickness, i.e. by 50 μm. The content of the inhibitor C in the porous structure is 8% by mass. The properties of the thus-produced film are shown in Table 2 hereinbelow.

EXAMPLE 9

A tubular anticorrosion polypropylene film is produced as in Example 7 hereinbefore, except that the level of the inhibitor C is maintained equal to 60 mm.

The apparent density of the resulting film is increased from 872 kg/m$^3$ to a value equal to the density of PP in the direction from the inner surface of the tubular film by $\frac{2}{3}$ of its thickness, i.e. by about 66 μm. The content of the corrosion inhibitor C in the porous structure is 12.0% by mass. The properties of the thus-produced film are illustrated in Table 2 hereinbelow.

EXAMPLE 10

A melt of low-density (high-pressure) polyethylene ($\rho_p=920$ kg/m$^3$, the solubility parameter $\delta_p=17$ (MJ/m$^3$)$^{\frac{1}{2}}$) is extruded through the shaping duct and slit of an extrusion die and air-blown into a tubular article simultaneously with cooling thereof at the speed of the film movement of 0.1 m/s. Below the crystallization line the tubular article is filled to the height of 10 mm with a 30% solution of the corrosion inhibitor A in the plastifying agent b ($\delta_A=20.5$ (MJ/m$^3$)$^{\frac{1}{2}}$) and set into rotating motion at the angular rotation speed $\omega$ equal to 3 s$^{-1}$. The ratio of $\omega/v=30$ m$^{-1}$. The thickness of the extruded film is 150 mm. The thus-produced tubular film is of a non-uniform structure. The porous structure is filled with the above-mentioned inhibitor liquid.

The apparent density of the resulting film is increased from 899 kg/m$^3$ to a value equal to the density of LDPE in the direction from the inner surface of the tubular film by $\frac{1}{4}$ of its thickness, i.e. by about 37 $\mu$m. The content of the above-mentioned inhibitor liquid in the porous structure is 4 g/m$^2$. The properties of the resulting film are shown in Table 2 hereinbelow.

EXAMPLE 11

A tubular anticorrosion polyethylene film is produced as in Example 10, except that the tubular article is filled to the height of 10 mm, the speed of the film extrusion is 0.1 m/s, the angular speed of rotation of the inhibitor liquid is 5 s$^{-1}$, the ratio of $\omega/v$ is 50 m$^{-1}$.

The apparent density of the resulting film is increased from 890 kg/m$^3$ to a value equal to the density of LDPE in the direction from the inner surface of the tubular film by $\frac{1}{2}$ of its thickness, i.e. by 75 $\mu$m. The content of the above-mentioned inhibitor liquid in the porous structure is 8 g/m$^2$. The properties of the thus-produced film are illustrated in Table 2 hereinbelow.

EXAMPLE 12

A tubular anticorrosion polyethylene film is produced in a manner similar to that described in Example 10 hereinbefore, except that the tubular article is filled to the height of 10 mm, the speed of the film movement is 0.1 m/s, the angular speed of the inhibitor liquid rotation is 6 s$^{-1}$, the ratio of $\omega/v$ is 60 m$^{-1}$.

The apparent density of the thus-produced film is increased from 886 kg/m$^3$ to a value equal to the density of LDPE in the direction from the inner surface of the tubular film by $\frac{3}{4}$ of its thickness, i.e. by 112 $\mu$m. The content of the above-mentioned inhibitor liquid in the porous structure is 10 g/m$^2$. The properties of the resulting film are illustrated in Table 2 hereinbelow.

EXAMPLE 13

A melt of HDPE ($\rho_p=950$ kg/m$^3$, the solubility parameter $\delta_p=16$ (MJ/m$^3$)$^{\frac{1}{2}}$) is extruded through a shaping duct and a slit of an extrusion die and air-blown into a tubular article simultaneously with cooling thereof at the speed of the film movement of 0.1 m/s.

The melt of HDPE in the zone of its outflow from the shaping slit is treated with a 3% solution of the inhibitor A in the plastifying agent a ($\delta_A=20.5$ (MJ/m$^3$)$^{\frac{1}{2}}$ supplied under the pressure of 25 MPa in the direction ensuring the formation, on the inner surface of the HDPE tubular film, of a porous structure filled with the above-mentioned inhibitor liquid.

The apparent density of the resulting film is increased from 928 kg/m$^3$ to a value equal to the density of HDPE in the direction from the inner surface of the tubular film by $\frac{1}{4}$ of its thickness, i.e. by about 50 $\mu$m. The content of the above-mentioned inhibitor liquid in the porous structure is 5 g/m$^2$. The properties of the thus-produced film are shown in Table 2 hereinbelow.

EXAMPLE 14

A tubular anticorrosion polyethylene film is produced as in Example 13 hereinabove, except that the melt of HDPE is treated with the inhibitor liquid supplied under the pressure of 36 MPa.

The apparent density of the resulting film is increased from 920 kg/m$^3$ to a value equal to the density of HDPE in the direction from the inner surface of the tubular film by $\frac{1}{2}$ of its thickness, i.e. by about 100 $\mu$m. The content of the above-mentioned inhibitor liquid in the porous structure is 9 g/m$^2$. The properties of the resulting film are shown in Table 2 hereinbelow.

EXAMPLE 15

A tubular anticorrosion polyethylene film is produced as in Example 13, except that the melt of HDPE is treated with the inhibitor liquid supplied under the pressure of 45 MPa.

The apparent density of the resulting film is increased from 916 kg/m$^3$ to a value equal to the density of HDPE in the direction from the inner surface of the tubular film by $\frac{2}{3}$ of its thickness, i.e. by about 133 $\mu$m. The content of the above-mentioned inhibitor liquid in the porous structure is 12 g/m$^3$. The properties of the thus-produced film are shown in Table 2 hereinbelow.

EXAMPLE 16 (Comparative, according to SU, A, 1207125)

A tubular anticorrosion film is produced from LDPE ($\rho_p=920$ kg/m$^3$).

A mixture of LDPE and the plastifying agent a at the mass ratio of 80:20 is extruded through a shaping slit of an extrusion die and air-blown into a tubular film simultaneously with cooling thereof at the speed of the film movement of 0.1 m/s. Into the cavity of the formed tubular film vapors of a sparingly soluble volatile inhibitor are fed (corrosion inhibitor A) at the temperature of 100° C. The resulting tubular film contains 1.5% by mass of the corrosion inhibitor.

In testing properties of the tubular anticorrosion films produced by the process according to the present invention and by the prior art process the breaking tensile strength and anticorrosion properties of the films were studied.

The breaking tensile strength was determined using a tearing machine at the speed of movement of the mobile clamp of 50 mm/min. The anticorrosion properties of the film were assessed at elevated values of relative humidity of the air and at an elevated temperature with discontinuous condensation of moisture on metal samples packed into the film.

Steel samples (from a carbon steel with a content of carbon of from 0.05 to 0.11% by mass) of the size of 25×25×1 mm are mechanically cleaned to remove the corrosion products, rinsed in gasoline, then in ethanol and dried. Thereafter, the steel samples were sealed into the manufactured anticorrosion film and kept under room conditions at the temperature of 20°±2° C. for 72 hours. Then the samples were placed into a heat-and-moisture chamber. The steel samples sealed into the tubular film were thermostated at the temperature of 55°±5° C. and relative humidity of 98±2% for 8 hours.

The condensation of moisture on the surface of the steel samples was caused by lowering temperature of the samples by 35° C. and the sealed samples were kept at the temperature of 20°±2° C. for 16 hours. The tests in the heat-and-moisture chamber were performed in one cycle. The tests were carried out till the origination of the first foci of the corrosion injury on the steel samples.

TABLE 2

| Film of Examples Nos | Thermoplastic matrix | Breaking tensile strength, MPa | Number of cycles till the appearance of the first foci of corrosion injury |
|---|---|---|---|
| 1 | LDPE | 12.6 | 25-26 |
| 2 | LDPE | 12.6 | 38-39 |
| 3 | LDPE | 12.6 | 40-42 |
| 4 | HDPE | 23.7 | 27-28 |
| 5 | HDPE | 23.7 | 35-36 |
| 6 | HDPE | 23.7 | 40-43 |
| 7 | PP | 25.4 | 30-32 |
| 8 | PP | 25.4 | 45-47 |
| 9 | PP | 25.4 | 50-53 |
| 10 | LDPE | 12.6 | 38-40 |
| 11 | LDPE | 12.6 | 43-45 |
| 12 | LDPE | 12.6 | 45-48 |
| 13 | HDPE | 25.0-26.0 | 30-31 |
| 14 | HDPE | 34.0-35.0 | 40-42 |
| 15 | HDPE | 43.0-44.0 | 44-45 |
| 16 (comparative) | LDPE | 12.4 | 15-17 |

BRIEF DESCRIPTION OF THE DRAWINGS

The present invention is further illustrated by a detailed description of an apparatus for implementation of the process for producing a polymeric anticorrosion film with reference to the accompanying drawings, wherein:

FIG. 2 is another embodiment of the extrusion die of the apparatus shown in FIG. 1, in elevation;

FIG. 3 is one of the embodiments, in the extrusion die shown in FIG. 2, of a channel for the supply of the inhibitor liquid; elevated-scale view;

FIG. 4 is still another embodiment of the channel for the supply of the inhibitor as shown in FIG. 3;

DETAILED DESCRIPTION OF THE INVENTION

Figure 1:
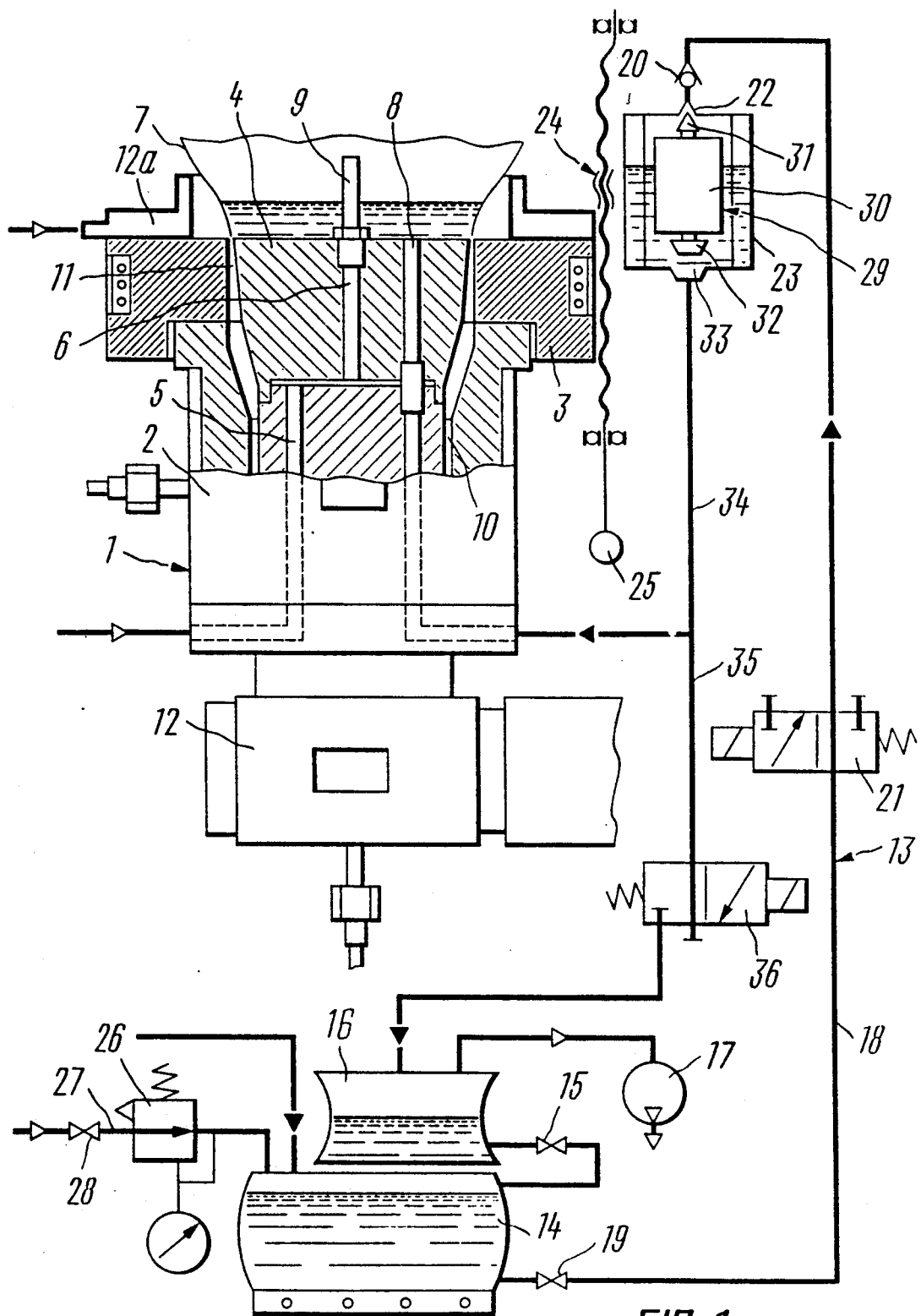
FIG. 1 is a schematic general view of the apparatus for implementing the process according to the present invention comprising an extrusion die, with a tear-out view.

An apparatus (FIG. 1) comprises an extrusion die 1 incorporating a hollow housing 2, a nozzle 3 mounted thereon, an assembled mandrel 4 passing through the nozzle and mounted in the housing 2. In the body of the mandrel 4 there are two communicating channels 4 and 6 for the supply of compressed air inside the extruded polymeric tubular film 7 and a channel 8 for the supply of the inhibitor liquid inside the tubular film 7. The channel 6 is provided with a socket pipe 9 with its outlet opening positioned above the level of the inhibitor liquid in the tubular film 7. The walls of the housing 2 and of the nozzle 3 form with the wall of the mandrel 4 a shaping duct 10 passing into an annular shaping slit 11. The extrusion die 1 is connected to an extruder 12 feeding it with a melt of a thermoplastic through the shaping duct 10. Above the nozzle 3 outside the formed tubular film 7 an angular manifold 12a is provided for cooling thereof by means of compressed air.

The apparatus is also equipped with a system 13 for the supply of the inhibitor liquid into the tubular film 7; the system consists of a heated delivery tank 14, a release valve 15 communicating it to a vacuum tank 16 with a vacuum pump 17 serving to evacuate the inhibitor liquid from the cavity of the tubular film 7 prior to discontinuation of work or in the case of breakdown of the tubular film.

The delivery tank 14, through a line 18 provided with a valve 19 and a check valve 20 is communicated, through a distributor 21, to the inlet opening 22 of a vessel 23.

The vessel 23 is mounted with the possibility of a vertical reciprocal movement effected by means of a kinematic pair 24—nut-screw. The nut is fixed on the housing of the vessel 23. The screw is set into motion from a drive 25. The tank 14 is connected, for adjusting the air pressure therein, to a pressure-reducing valve 26 communicating with a line 27 provided with a valve 28 for the supply of compressed air.

The vessel 23 comprises means 29 made as a float 30 with valves 31 and 32 for the inlet opening 22 and an outlet opening 33 respectively. The outlet opening 33 communicates, via a line 34, to the channel 8 in the mandrel 3 for the supply of the inhibitor liquid into the tubular film 7. The vessel 23 and the channel 8 form communicating vessels. The line 34 is connected additionally to a line 35 communicating via a distributor 36 to the vacuum tank 16.

Another embodiment of the extrusion die is shown in FIG. 2. At the end face of the mandrel 4 a bushing 37 is mounted with at least one hole 38 (FIG. 3) in the wall thereof. On the side of this hole 38 in the mandrel body 4 a recess 39 is provided which is opened towards its end face. The bushing 37 can be pressed into the mandrel 4 bore (FIG. 2) or be secured by any conventional technique. The bushing 37 can be of a cylindrical or conical shape, the ratio between diameters of the bushing 37 and the mandrel 4 at its end face is chosen within the range of from 0.83 to 0.95.

A cavity 40 is provided in the mandrel 4 which cavity has two coaxially mounted tubes 41 and 42 projecting above its end face inside the bushing 37. The tube 41 is a channel for the supply of compressed air inside the tubular film 7, the channel 43—for the supply of the inhibitor liquid into the tubular film 7. The channel 43 consists of an annular conduit 44 formed by the external surface of the tube 41 and by the inner surface of the tube 42, a line 45 (FIG. 3) with one end thereof being secured to the projecting part of the tube 42 and the other is secured in the opening 38 of the bushing 37; a recess 39 is an outlet opening of the channel 43. In FIG. 4 another embodiment of the channel 43 in the zone of the bushing 37 is shown. It comprises an annular conduit 44 and an annular duct 46 communicating with it and made under the bushing 37 in the body of the mandrel 4. The outlet opening of the duct 46 is located at the end face of the mandrel 4 and simultaneously serves as the outlet opening of the entire channel 43.

Figure 5:
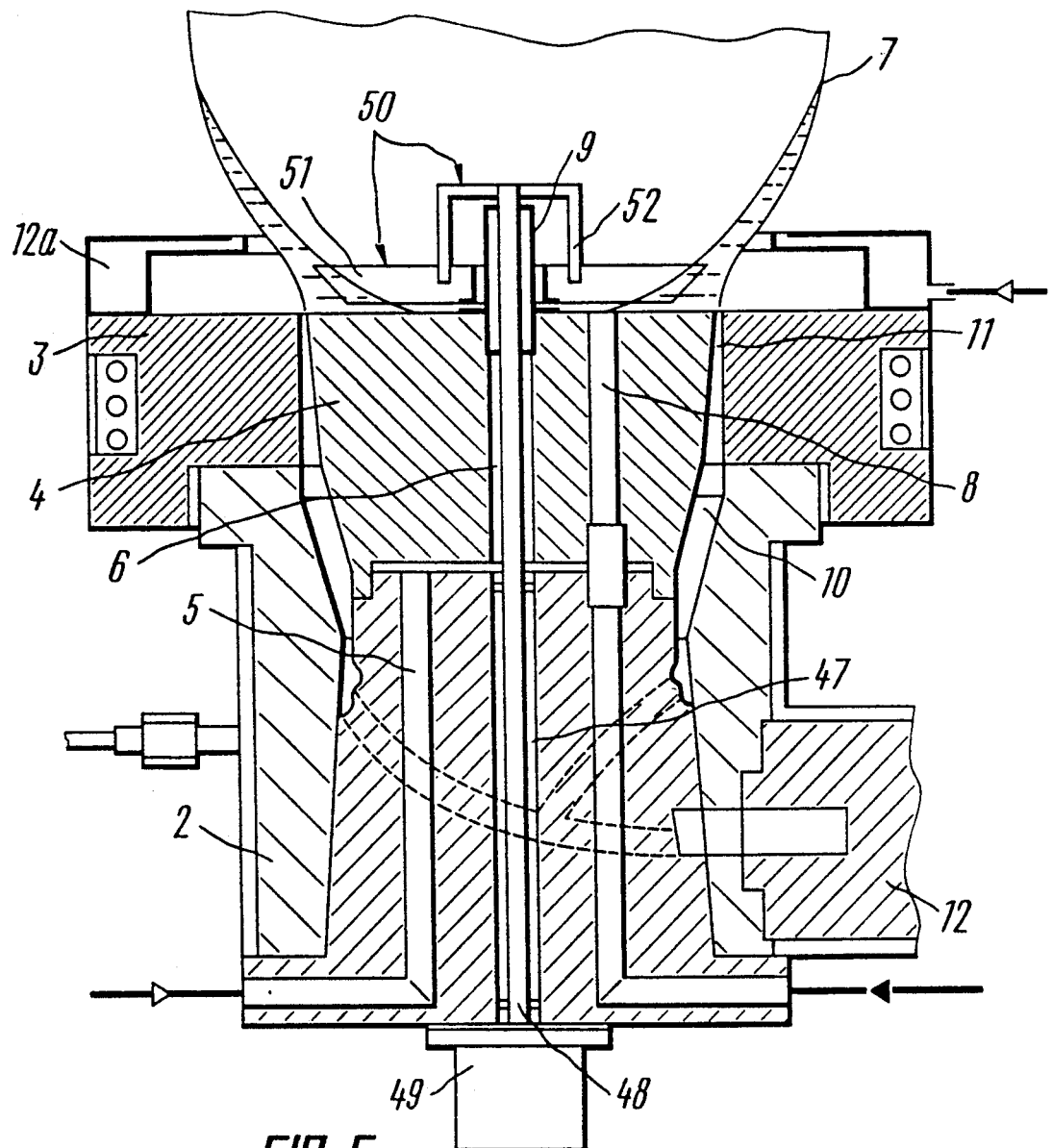
FIG. 5 is another embodiment of the extrusion die of the apparatus shown in FIG. 1, elevation view.
Figure 6:
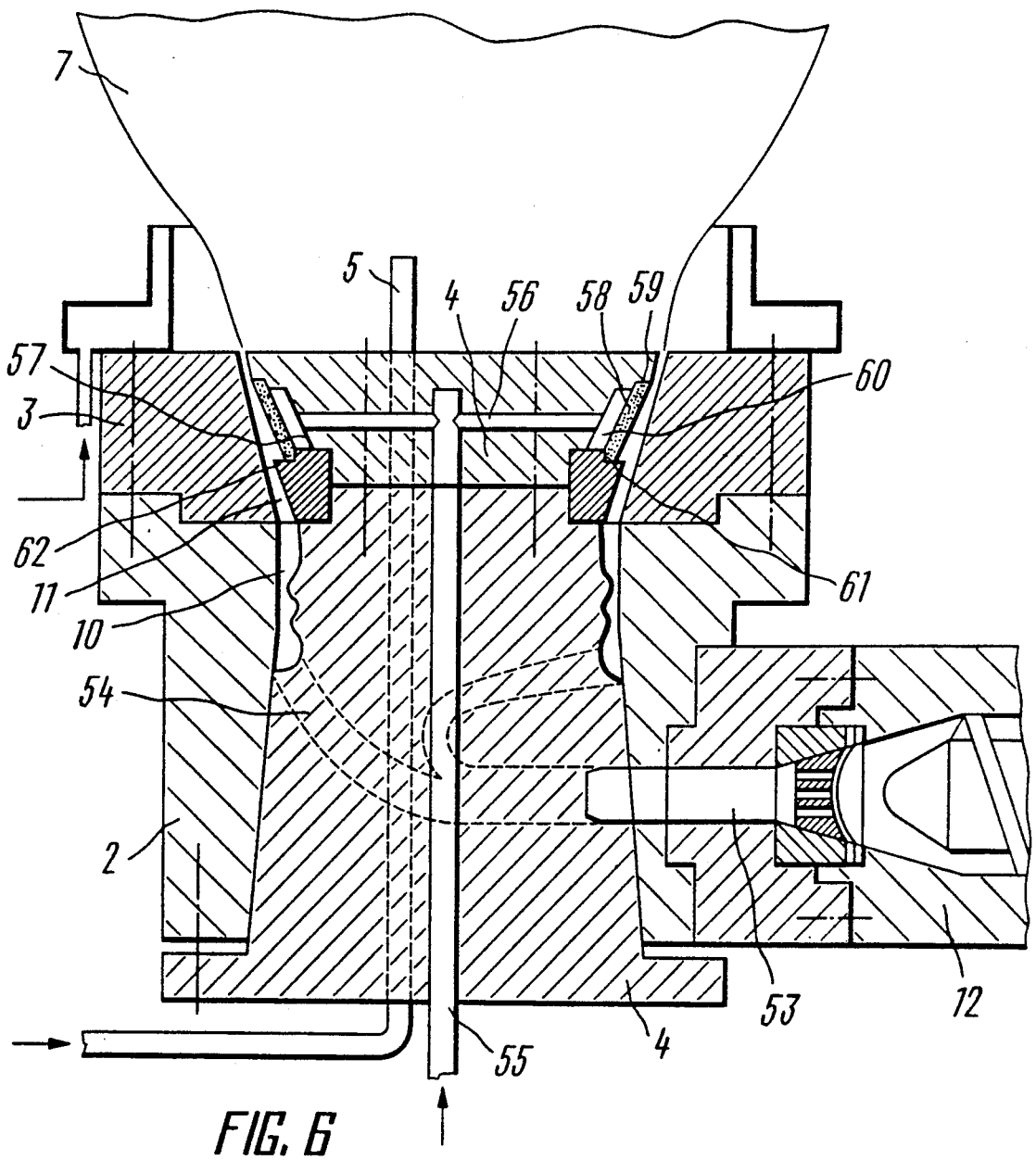
FIG. 6 is a schematic general view of the extrusion die for implementing the process according to the present invention.

Shown in FIG. 5 is another embodiment of the extrusion die in the apparatus according to the present invention. In the body of the mandrel 4 there are two communicating channels 5 and 6 for the supply of compressed air and a channel 8 for the supply of the inhibitor into the tubular film 7. In the channel 6 a socket pipe 9 is mounted so that it projects above the end face of the mandrel 4.

In the body of the mandrel 4 there is an additional channel 47 positioned coaxially to the channel 6. A shaft 48 passes through the channels 6 and 47; one end of the shaft is connected to a drive 49 for setting it into a rotating motion, while at the other end protruding from the socket pipe 9 a means 50 is provided to set into a rotating motion the inhibitor liquid supplied into the formed tubular film 7 through the channel 8. The means 50 is made as an impeller positioned close to the end face of the mandrel and provided with tongues 52 rigidly secured to the end of the shaft 48.

The apparatus according to the present invention operates in the following manner.

A melt of a thermoplastic from the extruder 12 (FIG. 1) is passed into the shaping duct 10 and the shaping slit 11 of the extrusion die 1. At the same time, compressed air is fed into the channels 5 and 6. Compressed air supplied via the socket pipe 9 from the channel 6 blows-up the thermoplastic leaving the slit 11 and being in the viscous-flow state into a tubular film 7 to a required size thereof. After adjusting the extruder 12 and the extrusion die 1 to produce the tubular film under appropriate conditions, the system of the supply of the inhibitor liquid into the formed tubular film 7 is switched-on. Compressed air is passed into the delivery tank 14 via the line 27 through the opened valve 28 and the pressure-reducing valve 26. At the same time, the valve 19 is opened and the inhibitor liquid is passed under the effect of the excessive pressure from the tank 14 via the line 18 through the distributor 21 and the check valve 20 into the inlet opening 22 and therefrom into the vessel 23. When the sealed float 30 comes upwards, the valve 32 opens the outlet opening 33 and the inhibitor liquid passes through the line 34 into the channel 8 of the extrusion die 1 and then into the cavity of the extruded polymeric tubular film 7; in so doing, it is spread over the end face of the mandrel 4. The vessel 23 can be moved in the vertical direction by means of the pair 24—nut-screw due to the rotating motion transmitted from the screw driven by the energized motor 25 to the nut secured to the housing of the vessel 23.

By moving the vessel 23, it is set into a position at the level of the outlet opening of the channel 8 ensuring outflow of the inhibitor liquid from the channel 8 and filling, thereby, of the tubular film 7 to the level below the line of crystallization of the thermoplastic, i.e. in the zone of its transition from the viscous-flow state into the elastic one.

The level of the liquid is set according to the required characteristics of anticorrosion and physicomechanical properties of the produced film. The amount of the inhibitor liquid passed into the vessel should be equal to or less than its consumption for the inhibition of the thermoplastic. Upon increasing of the liquid amount in the vessel 23 above the predetermined level the float 30 gets upwards and the valve 31 closes the inlet opening 22.

Before completion of the operation, or in the case of breakdown of the tubular film 7 there are switched-on the electric magnets of the distributors 21 and 36 and the vacuum pump 17. The supply of the inhibitor liquid into the vessel 23 is stopped, the line 35 is opened to communicate the channel 8 of the mandrel 4 and the vessel 23 to the vacuum tank 16. The inhibitor liquid contained in the tubular film 7 and in the vessel 23 is sucked into the tank 16. In the case of stoppage of operation and breakdown of the tubular film 7 this prevents spreading of the liquid over the extrusion die 1 and evaporation thereof, thus improving the operation conditions and reducing losses of the inhibitor liquid. After filling of the vacuum tank 16 the relief valve 15 is opened and the inhibitor liquid overflows into the delivery tank 14. The resulting anticorrosion tubular polymeric film is passed onto the rollers to be reeled into rolls for the delivery to the consumer.

The presence, in the system 13, of the vessel 23 mounted with the possibility of a reciprocal movement in the vertical direction at the level of the outlet opening of the channel 8 for the supply of the inhibitor liquid communicating, via the line 34, with this vessel 23 and forming communicating vessels therewith makes it possible to vary the level of the inhibitor liquid inside the tubular film 7. In so doing, the time of contact of the inner surface of the extruded polymeric tubular film 7 with the inhibitor liquid will be varied from the minimum at a small layer thereof above the mandrel 4 to the maximum at the layer of the inhibitor liquid in the tubular film 7 below the line of crystallization of the thermoplastic. Accordingly, the depth of permeation of the inhibitor liquid into the bulk of the thermoplastic will be varied and, hence, its concentration therein. This will make it possible to select films with different concentrations of the inhibitor liquid in their porous structures for packing articles from different materials and for different conditions of storage.

When the extrusion die 1 is embodied as shown in FIGS. 2, 3 and 4, the apparatus for implementing the process according to the present invention can give a number of advantages.

A melt of the thermoplastic from the extruder 12 is passed into the shaping duct 10 and the shaping slit 11. At the same time, compressed air is fed into the tube 41 which blows up the thermoplastic outflowing from the slit 11 into a tubular film. Simultaneously the inhibitor liquid is supplied from the system 13 operating as described hereinabove into the channel 43. Since the channel 43 has a number of regions, the inhibitor liquid passing into the cavity formed by the inner surface of the extruded tubular film 7 and by the outside surface of the bushing 37 moves successively through the channel 44, line 45 and the recess 39 (FIG. 3), or through the channel 44 and the channel 46 (FIG. 4). The level of the inhibitor liquid in the tubular film 7 is adjusted by setting the vessel 23 along the vertical at the level of the outlet opening of the channel 43. Prior to completion of operation or in the case of breakdown of the tubular film 7 the inhibitor liquid contained in the latter and in the vessel 23 is sucked into the tank 14.

The availability of the bushing 37 in the extrusion die 1 and the location of the outlet opening of the channel 43 outside this bushing 37 ensures maintaining the required level of the inhibitor liquid with a small amount thereof.

This makes it possible, in the case of breaking the film, to rapidly remove the inhibitor liquid from the cavity of the tubular film 7, thus increasing reliability of the apparatus due to prevention of outbursts of the inhibitor to the outside. This also improves conditions of labour and reduces non-productive consumption of the inhibitor liquid. Furthermore, the presence of a small amount of the inhibitor liquid in the cavity of the tubular film 7 does not disturb the temperature conditions of the process of extrusion and blowing of the tubular film 7.

The ratio of the outside diameter of the bushing 37 and the diameter of the mandrel 4 within the range of from 0.83 to 0.95 is caused, on the one hand, by the desire to use a minimum amount of the inhibitor liquid in the cavity of the tubular film 7 in order to prevent its thermal decomposition, to stabilize the operation conditions, as well as to most rapidly remove the liquid upon breaking of the tubular film 7, and, on the other hand, by the convenience of operation at the initial moment of extrusion, i.e. to avoid adherence of the extruded thermoplastic to the surface of the bushing 37 upon the formation of the tubular film 7.

In the case of provision of the impeller 51 in the extrusion die 1 as it is shown in FIG. 5, the apparatus operates in the following manner. A melt of the thermoplastic from the extruder 12 passes into the shaping duct 10 and the slit 11 of the extrusion die 1. Compressed air is passed into the channels 5 and 6 and blows-up the thermoplastic outflowing from the slit 11 in the viscous-flow state. Simultaneously, from the system 13 operating as described hereinbefore the inhibitor liquid is delivered through the channel 8 into the extruded polymeric tubular film 7. When the cavity of the tubular film is filled with the liquid, the drive 49 is energized to set into motion the shaft 48 and, through tongues 52, the impeller 51. The inhibitor liquid is set into rotating motion by means of the impeller 51. While rotating at the predetermined speed it acquires a funnel-like form and spreads over the surface of the extruded tubular film 7.

This makes it possible, using a small amount of the inhibitor, to provide, first of all, an optimal level of the inhibitor liquid contacting with the polymeric tubular film and, secondly, an optimal pressure thereof onto the tubular film which, eventually ensures the formation of the film so that in its porous structure a maximum amount of the corrosion inhibitor is present.

An intensive rotation of the inhibitor liquid also breaks the vapour jacket formed at the interface thermoplastic-liquid which hinders an effective penetration of the inhibitor liquid into the bulk of the film.

On completion of operation or in the case of disturbed process conditions the supply of compressed air and the inhibitor liquid into the cavity of the tubular film 7 is stopped, the impeller 51 is switched-off and the inhibitor liquid above the mandrel 4 is sucked into the tank 16.

The presence, in the extrusion die 1 of the apparatus according to the present invention, of the means 50 for imparting a rotating motion to the inhibitor liquid supplied through the channel 8 and located above the mandrel 4 into the cavity of the polymeric tubular film 7 makes it possible to create a liquid vortex formed over the inner surface of the extruded tubular film. This allows:

using a small amount of the inhibitor liquid above the mandrel 4 and varying the rotation speed, to maintain its optimal level in the polymeric tubular film 7, thus increasing the efficiency of saturation of the film with the corrosion inhibitor;

to intensify the dynamic interaction of the inhibitor liquid with the surface of the tubular film 7 owing to the origination of centrifugal forces in the rotating liquid which causes intensification of the process of diffusion of the corrosion inhibitor into the bulk of the thermoplastic;

to destroy the vapor jacket formed at the boundary between the thermoplastic and the liquid due to an intensive agitation of the liquid, thus also increasing the depth of penetration of the corrosion inhibitor into the thermoplastic;

to distribute relatively uniformly the pressure of the liquid onto thermoplastic over the entire surface of their contact, thus avoiding breakdown of the tubular film and increasing reliability of the process;

to avoid the additional contact of the mandrel 4 with the inhibitor liquid over a large surface area, thus ensuring optimal thermal conditions of the process of extrusion and blowing-up of the tubular polymeric film 7.

The polymeric anticorrosion film according to the present invention has sufficiently high mechanical-strength and corrosion-protective characteristics, makes it possible to control the release of the corrosion inhibitors due to the structure non-uniformity only into the volume of the packing space, thus minimizing pollution of the environments with harmful substances and, thereby, improving conditions of labor for the personnel handling the materials of this kind; it also reduces losses of the inhibitors.

The film according to the present invention ensures a long-time protection of ferrous and non-ferrous metals from atmospheric corrosion and meets the requirements imposed on the preservation-and-lubrication materials. In addition, while having a sufficient transparency, it enables a visual control of the metal articles packed thereinto without reconservation and repacking; it also allows to impart, to the articles to be packed, a specific decorative appearance owing to the relief character of the film surface on the side of the porous structure. Furthermore, the polymeric anticorrosion film according to the present invention is simple in manufacture and can be produced using apparatus having only one single-slit extrusion die. The process and apparatus according to the present invention enable the manufacture of the film according to the invention without any additional material and power consumption.

The polymeric anticorrosion film according to the present invention can be used as a preservation-and-packing material for protection of metal articles against atmospheric corrosion and aggressive media.

What is claimed is:

1. A polymeric anticorrosion film, comprising: a thermoplastic matrix made with a gradual transition from a poreless to a porous structure formed by a system of closed and communicating pores filled with an inhibitor liquid which is a corrosion inhibitor in a liquid phase or its solution in a plastifying agent, with an increasing apparent density to a value equal to the thermoplastic density by $\frac{1}{4}-\frac{2}{3}$ of the film thickness in the direction from one of its surfaces.

* * * * *